US010583717B2

(12) United States Patent
Hoggarth et al.

(10) Patent No.: US 10,583,717 B2
(45) Date of Patent: Mar. 10, 2020

(54) VEHICLE DOOR SYSTEM

(71) Applicant: FORD GLOBAL TECHNOLOGIES, LLC, Dearborn, MI (US)

(72) Inventors: Marcus Hoggarth, Hertfordshire (GB); Matthew Graeme Leck, London (GB); Benjamin Carroll, London (GB); Stephen De Saulles, London (GB); Edward Rose, London (GB); Morten Warren, Cobham Surrey (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/101,831

(22) Filed: Aug. 13, 2018

(65) Prior Publication Data
US 2019/0061489 A1    Feb. 28, 2019

(30) Foreign Application Priority Data

Aug. 24, 2017    (GB) .................................... 1713620.1

(51) Int. Cl.
*B60J 5/04* (2006.01)
*B60J 5/06* (2006.01)

(52) U.S. Cl.
CPC ........... *B60J 5/0479* (2013.01); *B60J 5/0473* (2013.01); *B60J 5/06* (2013.01); *B60J 5/049* (2013.01); *B60J 5/0472* (2013.01); *B60J 5/0498* (2013.01)

(58) Field of Classification Search
CPC ........... B60J 5/0479; B60J 5/0473; B60J 5/06
USPC ...................................... 296/146.11, 146.12
See application file for complete search history.

(56) References Cited

U.S. PATENT DOCUMENTS

| 1,603,181 | A | 10/1926 | Aborn |
| 1,603,182 | A | 10/1926 | Aborn |
| 5,242,208 | A | 9/1993 | Ohya |
| 6,644,717 | B2 * | 11/2003 | Lorentz .................. B60J 5/0497 296/146.4 |
| 6,899,374 | B1 | 5/2005 | Heard |

(Continued)

FOREIGN PATENT DOCUMENTS

| DE | 202008007341 | 10/2008 |
| DE | 102013018670 | 5/2015 |

(Continued)

OTHER PUBLICATIONS

Rolls-Royce Motor Cars: "The visionary Rolls-Royce 103EX. Journey into the future of luxury.", Youtube, Jun. 16, 2016 (Jun. 16, 2016), p. 3 pp., XP854978766, Retrieved from the Internet: URL:https://www.youtube.com/watch?v=dGSm082ELXY, [retrieved on Oct. 9, 2018], 1 minute 28 seconds (1:28).

(Continued)

*Primary Examiner* — Joseph D. Pape
(74) *Attorney, Agent, or Firm* — Vichit Chea; Brooks Kushman P.C.

(57) ABSTRACT

A vehicle door system having an upper door configured to cover a top portion of an opening in the body of a vehicle and to open in an upward direction, and a lower door configured to cover a bottom portion of the opening and to open in a sideways direction. The upper door includes a deployable portion configured to form at least a portion of a canopy extending away from the body of the vehicle.

11 Claims, 4 Drawing Sheets

(56) References Cited

U.S. PATENT DOCUMENTS

| | | | | |
|---|---|---|---|---|
| 8,449,015 B2* | 5/2013 | Brown | .................. | B60J 5/0473 |
| | | | | 296/146.12 |
| 10,272,748 B2* | 4/2019 | Shin | ...................... | B60J 5/0486 |
| 2005/0116496 A1 | 6/2005 | Lowson et al. | | |
| 2006/0152029 A1 | 7/2006 | Tomasson et al. | | |
| 2013/0097940 A1 | 4/2013 | Brown et al. | | |
| 2015/0232132 A1 | 8/2015 | Fischer | | |

FOREIGN PATENT DOCUMENTS

| | | |
|---|---|---|
| EP | 1036681 A1 | 9/2000 |
| EP | 1428709 A2 | 6/2004 |
| EP | 1977920 A1 | 10/2008 |
| FR | 2937002 A1 | 4/2010 |
| GB | 19118403 | 12/2011 |

OTHER PUBLICATIONS

Examination Report GB1713620.1, Completed by the Great Britain Patent Office, dated Sep. 25, 2019, 5 pgs.

\* cited by examiner

VEHICLE DOOR SYSTEM

CROSS-REFERENCE TO RELATED APPLICATIONS

This application claims foreign priority benefits under 35 U.S.C. § 119(a)-(d) to GB Application 1713620.1 filed Aug. 24, 2017, which is hereby incorporated by reference in its entirety.

TECHNICAL FIELD

This disclosure relates to a vehicle door system, and in particular, but not exclusively, to a vehicle door system having four doors that cooperate to close an opening in a body of a vehicle.

BACKGROUND

A vehicle, such as a car or a truck, typically has one or more doors that allow access into and out of the vehicle. For example, a vehicle may have front doors to allow an individual to access the front seats of the vehicle, and rear doors to allow an individual to access the rear seats of the vehicle. Such a seating layout is commonplace, and is usually dependent on the configuration of the vehicle's chassis.

With the advent of electric and/or autonomous vehicles, an automotive designer is less restricted in the design of the passenger compartment. As a result, the seating arrangement in a modern vehicle may be different from that of a conventional vehicle. Furthermore, the seating arrangement in a modern vehicle may be reconfigurable depending on a passenger's requirements for a particular journey. It is desirable, therefore, to provide a vehicle door that allows sufficient access into and out of a vehicle irrespective of the seating arrangement of the vehicle.

SUMMARY

According to an aspect of the present disclosure there is provided a vehicle door system having an upper door configured to cover a top portion, e.g. only a top portion, of an opening in the body of a vehicle and to open in an upward direction, and a lower door configured to cover a bottom portion, e.g. only a bottom portion, of the opening and to open in a sideward direction, the upper door comprising a deployable portion configured to form at least a portion of a canopy extending away from the body of the vehicle when the upper door is at least partially open. The upper door may be a gullwing door.

The upper and lower doors may cooperate to fully close the opening in the body of the vehicle. The upper door may be rotationally and/or movably coupled to the body of the vehicle towards or at a top edge of the opening in the body of the vehicle. The lower door may be rotationally and/or movably coupled to the body of the vehicle towards or at a side edge of the opening in the body of the vehicle. The lower door may be rotationally and/or movably coupled to the body of the vehicle at a point remote from a side edge of the opening in the body of the vehicle.

The upper door may be configured to translate vertically when the vehicle is on a level surface, with respect to the opening in the body of the vehicle. The lower door may be configured to translate horizontally when the vehicle is on a level surface, with respect to the opening in the body of the vehicle.

A bottom edge of the upper door and a top edge of the lower door may be configured to engage each other when the first and lower doors are in a closed position. For example, the bottom edge of the upper door and the top edge of the lower door may be shaped to conform to each other when the first and lower doors are in a closed position. The first and lower doors may be brought into sealing engagement when the first and lower doors are in a closed position.

The upper door may comprise a first portion and a second portion. The first portion and the second portion may be moveably, e.g. rotationally and/or movably, coupled. The first portion and the second portion may be configured to fold with respect to each other. The upper door may comprise a biasing element configured to bias the first portion away from the second portion. The biasing element may be configured to support at least part of the weight of the second portion, e.g. when the upper door is in an at least partially open position. For example, where the first and second portions are pivotably connected, the biasing element may be configured to support the second portion relative to the first portion such that the second portion extends away from the first portion in a substantially horizontal plane.

The canopy may be configured to provide cover/shelter for an individual standing next to or near to the opening in the body of the vehicle. The canopy may extend away from the body of the vehicle by an amount in the range of approximately 0.3 m to 1.2 m. The upper door may comprise a deployable portion configured to deploy from the second portion of the upper door. The deployable portion may be configured to alter the amount by which the canopy extends away from the body of the vehicle.

The vehicle door system may comprise another door, e.g. a second upper door. The second upper may be configured to cooperate with the upper door to cover the top portion of the opening in the body of the vehicle. The second upper door may be configured to open in an upward direction.

The vehicle may comprise another door, e.g. a second lower door. The second lower door may be configured to cooperate with the lower door to cover the bottom portion of the opening in the body of the vehicle. The second lower door may be configured to open in a sideways direction.

The second upper door may be provided without the second lower door, and the second lower door may be provided without the second upper door. The vehicle door system may comprise any appropriate number of doors in addition to the first and second upper and lower doors.

The vehicle door system may comprise a step that is configured to deploy, e.g. from the body of the vehicle and/or the lower door, proximate to a lower edge of the opening in the body of the vehicle.

According to another aspect of the present disclosure there is provided a method of accessing a vehicle, the vehicle having an upper door configured to cover a top portion of an opening in the body of the vehicle, and a lower door configured to cover a bottom portion of the opening, the upper door comprising a deployable portion configured to form at least a portion of a canopy extending away from the body of the vehicle when the upper door is at least partially open, the method comprising: opening the upper door in an upward direction, and opening the lower door in a sideward direction to allow a user to access the vehicle; and deploying the deployable portion to form at least a portion of a canopy extending away from the body of the vehicle when the upper door is at least partially open.

A vehicle may be provided comprising one or more of the above-mentioned vehicle door systems.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

For a better understanding of the present disclosure, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure provides a vehicle door system configured to close an opening in a body of a vehicle. The vehicle may be any type of vehicle, such a car, a van, a truck, a marine vessel or an aircraft. The vehicle may be a vehicle having a passenger compartment with a reconfigurable seating arrangement, for example a seating arrangement having one or more vehicle seats that can be moved around the passenger compartment.

Figure 1A:
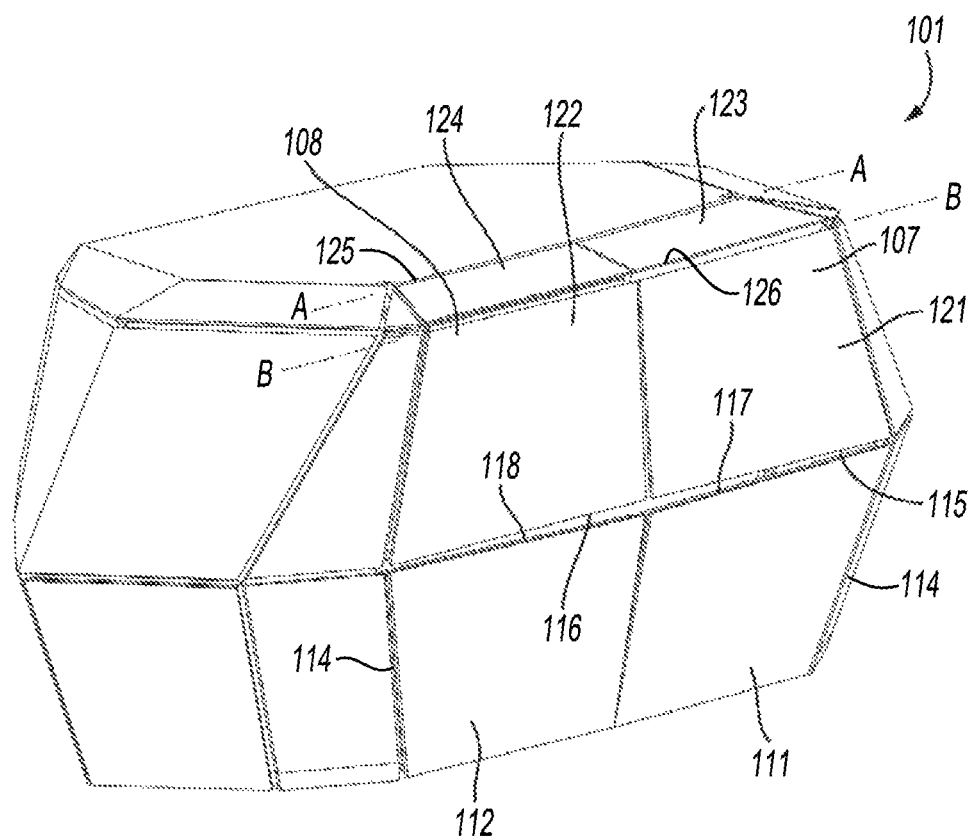
FIG. 1A shows a vehicle body having a plurality of doors in a fully closed position.
Figure 1B:
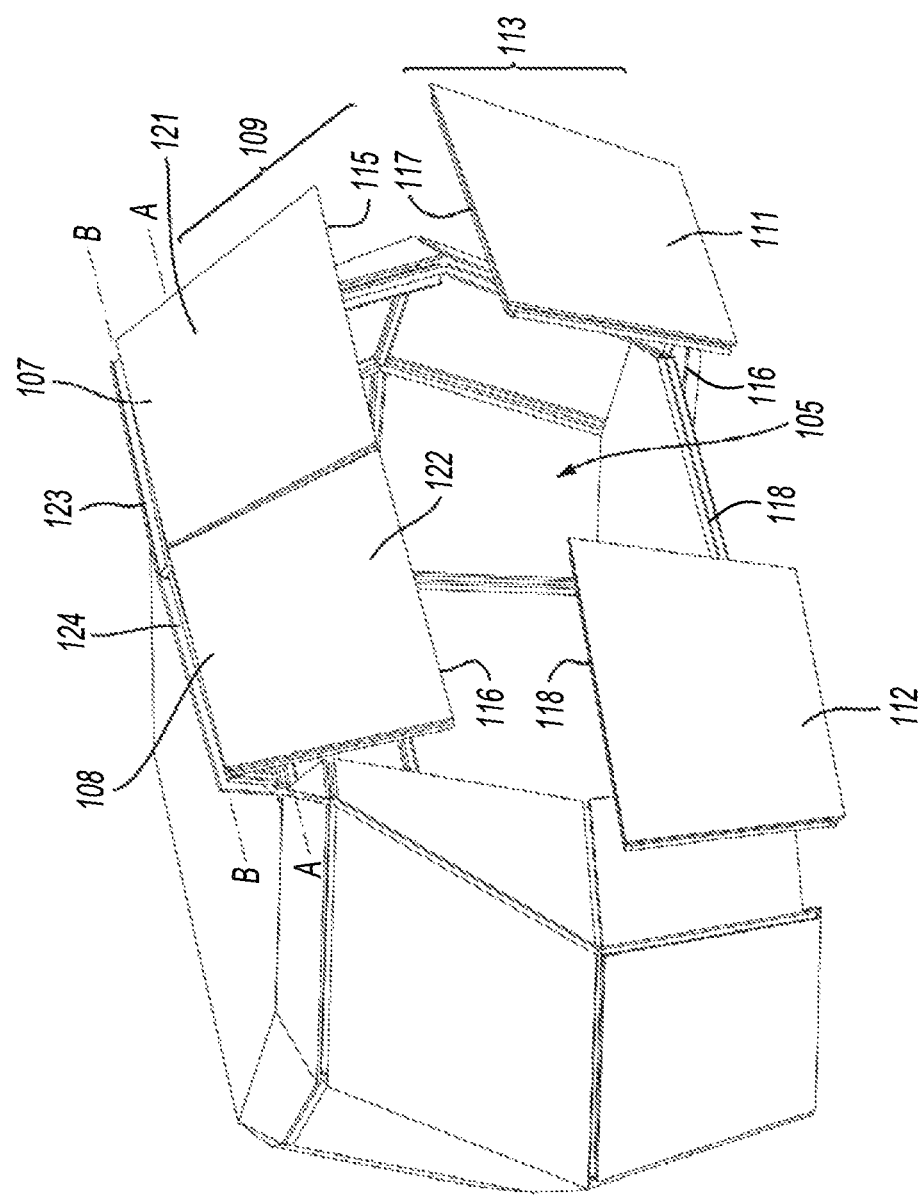
FIG. 1B shows a vehicle body having a plurality of doors in a partially open position.
Figure 1C:
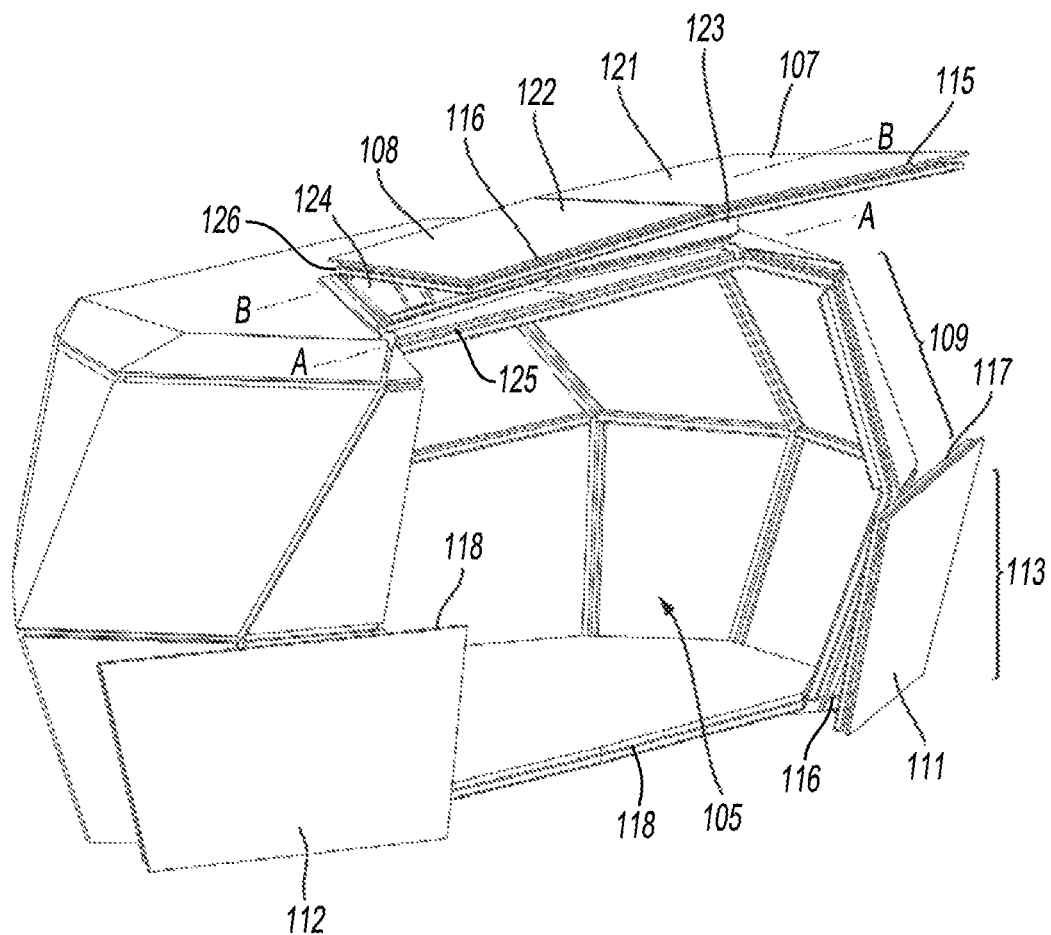
FIG. 1C shows a vehicle body having a plurality of doors in a fully open position.

FIGS. 1A to 1C show a vehicle body, for example a passenger compartment 101 of a vehicle. Although not shown in the figures, it is understood that the passenger compartment 101 may be mounted on, and/or form a part of, a chassis of the vehicle. It is also understood that the passenger compartment 101 shown in the figures may be of any appropriate size and shape depending on the configuration of the vehicle, and that the size and shape of the passenger compartment 101 is not limited to that show in the figures. Indeed, the depicted passenger compartment 101 is shown in a simplified state for the sake of describing the claimed invention.

The passenger compartment 101 has a plurality of doors configured to close, e.g. seal and close, an opening 105 in the passenger compartment 101. In the arrangement shown in FIGS. 1A to 1C, the passenger compartment 101 has four doors that cooperate to close the opening 105. For example, the passenger compartment 101 has two top doors 107, 108 that are configured to cooperate to cover a top portion 109 of the opening 105 of the passenger compartment 101, and two bottom doors 111, 112 that are configured to cooperate to cover a bottom portion 113 of the opening 105 of the passenger compartment 101. The top doors 107, 108 and the bottom doors 111, 112 cooperate to fully close the opening 105 when the doors 107, 108, 111, 112 are in a closed position. However, the passenger compartment 101 may have a door system having any appropriate number of top doors and bottoms doors. For example, the passenger compartment 101 may have at least one top door and at least one bottom door that cooperate to fully close the opening 105 in the body of the vehicle.

In the arrangement shown in FIGS. 1A to 1C, each of the top doors 107, 108 is configured to cover half of the top portion 109 of the opening 105, and each of the bottom doors 111, 112 is configured to cover half of the bottom portion 113 of the opening 105. In this direction, each of the doors 107, 108, 111, 112 cover approximately one quarter of the opening 105 in the passenger compartment 101. However, the doors 107, 108, 111, 112 may be configured to cover any appropriate amount of the opening 105. For example, the top and bottom portions 109, 113 of the opening 105 may be of different overall sizes, such that the total size of the opening 105 is not divided equally between the top and bottom portions 109. In one arrangement, the top portion 109 may make up about 25% of the total size of the opening 105, the bottom portion 113 making up the rest, or vice versa.

In the arrangement shown in FIGS. 1A to 1C, the top doors 107, 108 are configured to open in an upward direction e.g. in a direction towards and away from a top edge of the opening 105. For example, each of the top doors 107, 108 may be coupled to the body of the vehicle so that they may be opened and closed in a substantially vertical direction. The top doors 107, 108 may be moveably, e.g. rotationally, coupled to the vehicle body to allow the top doors 107, 108 to open to uncover the top portion 109 of the opening 105. In the arrangement shown in FIGS. 1A to 1C, the top doors 107, 108 are coupled together, e.g. at respective lateral edges, so that the top doors 107, 108 open and close at the same time. In another arrangement (not shown), the top doors 107, 108 may be able to move independently, so as to allow each of the top doors 107, 108 to open by a different amount. For example, the door system may comprise a releasable securing mechanism configured to secure the top doors 107, 108 together. The releasable securing mechanism may be actuated to selectively secure and unsecure the top doors 107, 108 to and from each other. This has the advantage of the door system having a plurality of operational states. For example, an individual may select a door configuration in which both of the top doors 107, 108, or only one of the top doors 107, 108 are open, depending on the requirements of the individual.

In the arrangement shown in FIGS. 1A to 1C, the bottom doors 111, 112 are configured to open in a sideways direction, e.g. in a lateral direction towards a side edge of the opening 105. For example, each of the bottom doors 111, 112 may be coupled to the body of the vehicle so that they may be opened and closed in a substantially horizontal direction on a hinge 114 or a set of arms 116 (or bracket) in a track 118. The bottom doors 111, 112 may be moveably, e.g. rotationally, coupled to the vehicle body to allow the bottom doors 111, 112 to open to uncover the bottom portion 113 of the opening 105. In the arrangement shown in FIGS. 1A to 1C, the bottom doors 111, 112 are configured to move away from each other towards opposite sides of the opening 105 in the vehicle body.

The bottom doors 111, 112 may be configured to move at the same time. For example, the bottom doors 111, 112 may be operatively coupled, e.g. by a geared mechanism, so that actuation of one of the bottom doors 111, 112 effects the movement of the other of the bottom doors 111, 112.

Alternatively, each of the bottom doors 111, 112 may be configured to move independently from each other. For example, each of the bottom doors 111, 112 may be actuated separately from each other, so as to allow access to only a part of the bottom portion 113 of the opening 105. This has the advantage of the door system having a plurality of operational states. For example, an individual may select a door configuration in which only one of the bottom doors 111, 112 are open, depending on the requirements of the individual.

In the arrangement shown in FIGS. 1A to 1C, the bottom edges 115, 116 of the top doors 107, 108 are configured to engage the top edges 117, 118 of the bottom doors 111, 111. In particular, the bottom edge 115 of the top door 107 is configured to engage the top edge 117 of the bottom door 111. Similarly, the bottom edge 116 of the top door 108 is configured to engage the top edge 118 of the bottom door 112. In the arrangement shown in FIGS. 1a to 1c, the bottom edges 115, 116 of the top doors 107, 108 and the top edges 117, 118 of the bottom doors 111, 112 are straight edges. However, the edges 115, 116, 117, 118 of the doors 107, 108, 111, 112 may be of any appropriate size and shape to ensure that the top doors 107, 108 engage, e.g. fully engage, the bottom doors 111, 112 when in a closed state.

One advantage of the door system shown in FIGS. 1A to 1C is that the doors 107, 108, 111, 112 may be moved into a variety of positions to account for the requirements of the individual using the vehicle. For example, where all of the doors 107, 108, 111, 112 are in a fully open position, as shown in FIG. 1C, access into and out of the passenger compartment 101 is unhindered, allowing an individual to move into the passenger compartment 101 using any portion of the opening 105. This is especially advantageous where the vehicle comprises a seating arrangement that may be reconfigured. For example, the vehicle may comprise a plurality of movable seats that may not necessarily be in the same position within the passenger compartment 101 whenever an individual uses the vehicle. As such, since the door system allows for unhindered access across the extent of the opening 105, the individual is able to access any portion of the opening 105 that is otherwise not obstructed by a vehicle seat. For example, if a vehicle seat is positioned to the right-hand side of the opening 105, the individual may enter the passenger compartment 101 to the left-hand side of the opening 105, and vice versa.

Figure 2:
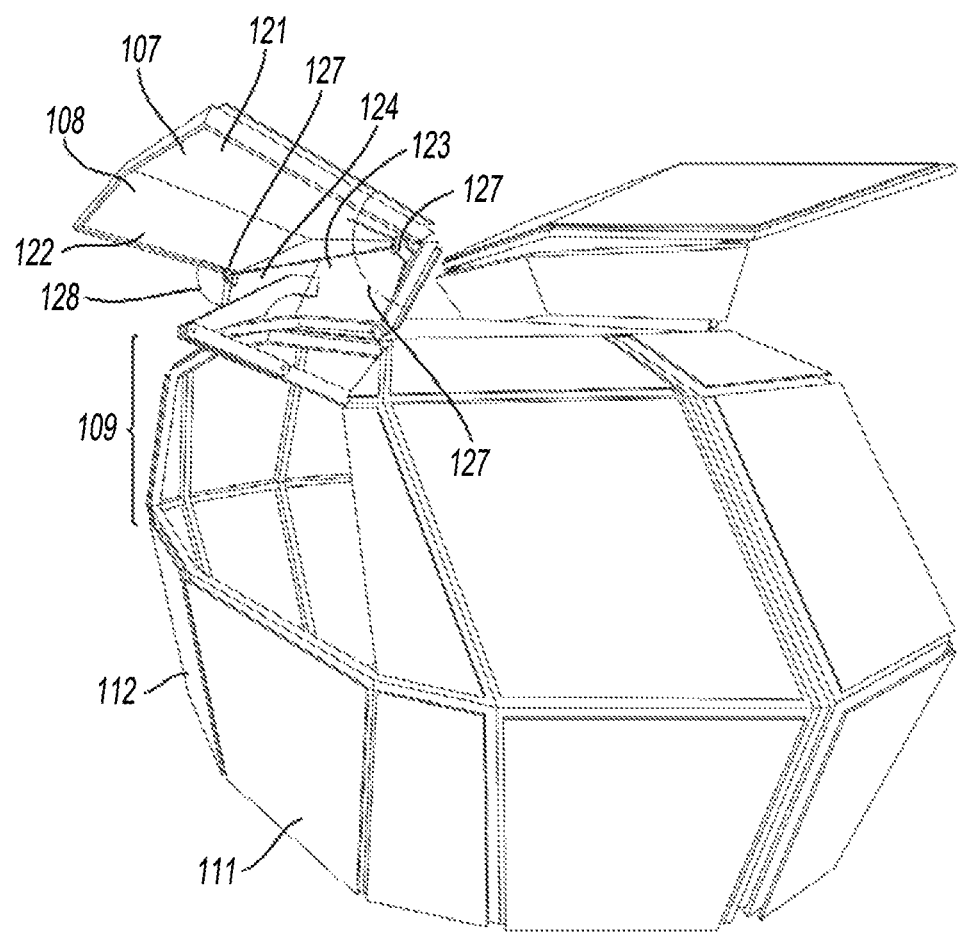
FIG. 2 shows a vehicle body having a door in an open position.

In some scenarios, the individuals occupying the passenger compartment 101 may wish to park their vehicle close to an event, such as a concert or a sports match, and watch the event whilst sitting in the vehicle. In such a case, the doors 107, 108, 111, 112 may be arranged so that the bottom doors 111, 112 are closed, to provide some privacy, and so that the top doors 107, 108 are open, so as to allow the individuals to view the event, as shown in FIG. 2 for example. In another arrangement (not shown), an individual may wish to open only one of the top doors 107, 108 and/or only one of the bottom doors 111, 112.

In the arrangement shown in FIGS. 1A to 2, the top doors 107, 108 each comprise a first portion 121, 122 and a second portion 123, 124 that are movably coupled to each other. For example, the first portion 121, 122 and second portion 123, 124 may be connected by virtue of a hinge, which allows the first portion 121, 122 and second portion 123, 124 to fold relative to each other. One advantage of this feature is that the clearance between the vehicle body and another article, such as another vehicle or a wall, is less than that required if the top doors 107, 108 were to be formed from a single door portion. For example, FIGS. 1A to 1C depict the doors 107, 108, 111, 112 in a closed state, a partially open state, and a fully open state respectively. Seen most clearly from FIG. 1B, the first portions of 121, 122 of the top doors 107, 108 pivot about a first axis AA on a hinge 125, the second portions of 123, 124 of the top doors 107, 108 pivot on a hinge 126 about a second axis BB. In this direction, the second portions 123, 124 of the top doors 107, 108 hang down from axis BB as the top doors 107, 108 open. Importantly, this allows the second portions of 123, 124 of the top doors 107, 108 to stay close to the body of the vehicle as the top doors 107, 108 open, which reduces the clearance needed, e.g. to the side of the vehicle, to open the top doors 107, 108.

FIG. 2 shows further detail of the coupling between the first portion 121, 122 and second portion 123, 124. For example, the top doors 107, 108 may comprise a biasing element 127, such as a spring or gas strut, configured to bias the first portion 121, 122 away from the second portion 123, 124. In the arrangement shown in FIG. 2, the biasing element 127 is configured to support the weight of the second portion 123, 124, when the first portion 121, 122 is inclined towards the roof of the passenger compartment 101. In this direction, the first portion 121, 122 and second portion 123, 124 are biased to maintain an angular clearance 128 between the first portion 121, 122 and the second portion 123, 124. In one arrangement, the spring rate of the biasing element 125 may be selected to define by how much the second portion 123, 124 is inclined towards the roof of the passenger compartment 101, for example when the top door 107, 108 is in a fully open position. Additionally, or alternatively, the top doors 107, 108 may comprise an actuator configured to move, e.g. rotate and/or translate, the first portion 121, 122 relative to the second portion 123, 124. For example, the hinged coupling 126 between the first portion 121, 122 and the second portion 123, 124 may be driven to control the angle 128 between the first portion 121, 122 and the second portion 123, 124. In one arrangement, the coupling between the first portion 121, 122 and the second portion 123, 124 may be operatively connected to the coupling between the first portion 121, 122 and the body of the vehicle, so that the actuation of the first portion 121, 122 relative to the body of the vehicle effects the movement of the second portion 123, 124 relative to the first portion 121, 122.

Irrespective of whether the top doors 107, 108 comprise a single portion, or multiple portions such as that shown in the Figures, the top doors 107, 108 are configured to extend away from the body of the vehicle when the top doors 107, 108 are in an at least partially open state. In particular, the top doors 107, 108 are configured to form a canopy over the entrance to the passenger compartment 101, when the top doors 107, 108 are open. For example, when the top doors 107, 108 are in a fully open position, the top doors 107, 108 may extend away from body of the vehicle, for example away from a top edge of the opening 105, by an amount sufficient to provide cover or shelter for an individual standing next to the opening 105 in the passenger compartment 101. In this direction, an individual may be sheltered from rain as he or she enters or exits the passenger compartment 101. This is particularly advantageous, as it allows the individual to remain dry while removing an item of clothing before entering the passenger compartment 101.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle door system having first and second upper doors independently movable between an open position and a closed position to cover only a top portion of an opening in a body of a vehicle and to open in an upward direction, and first and second lower doors independently movable to cover only a bottom portion of the opening, wherein the lower doors are translated by arms laterally with respect to the opening in the body of the vehicle to open in a lateral direction, the first and second upper doors each including a deployable portion configured to form at least a portion of a canopy extending away from the body of the vehicle when at least one of the upper doors is at least partially open.

2. A vehicle door system according to claim 1, wherein the upper and lower doors cooperate to fully close the opening in the body of the vehicle.

3. A vehicle door system according to claim 1, wherein the first and second upper doors are rotationally coupled to the body of the vehicle at a top edge of the opening in the body of the vehicle.

4. A vehicle door system according to any of claim 1, wherein the lower door is movably coupled by arms to the body of the vehicle at a point remote from a side edge of the opening in the body of the vehicle.

5. A vehicle door system according to claim 1, wherein a bottom edge of the first and second upper doors and a top edge of the first and second lower doors are configured to engage each other when the respective upper and lower doors are each in a closed position.

6. A vehicle door system according to claim 1, wherein the upper doors each further comprise a first portion and a second portion, the first portion and the second portion being connected by a hinge to fold with respect to each other.

7. A vehicle door system according to claim 6 further comprising:
a biasing element operatively connected to the first portion and the second portion of each door to bias the first portion away from the second portion.

8. A vehicle door system according to claim 6 further comprising:
a hinge rotationally coupling the first portion and the second portion of each of the upper doors.

9. A vehicle door system according to claim 1, wherein the canopy is configured to extend away from the body of the vehicle for covering an individual when standing next to the opening in the body of the vehicle.

10. A vehicle door system according to claim 1, wherein the first and second upper doors are gullwing doors.

11. A method of accessing a vehicle, the vehicle having first and second upper doors configured to cover only a top portion of an opening in a body of the vehicle, and first and second lower doors configured to cover only a bottom portion of the opening, the upper doors comprising a deployable portion configured to form at least a portion of a canopy extending away from the body of the vehicle when at least one of the upper doors are open, the method comprising:
Opening at least one of the upper doors in an upward direction;
opening at least one of the lower doors in a sideward direction to allow a user to access the vehicle; and
deploying at least one of the deployable portions to form at least a portion of a canopy extending away from the body of the vehicle when at least one of the upper doors is open.

\* \* \* \* \*